United States Patent
Wang

(10) Patent No.: US 11,698,686 B2
(45) Date of Patent: Jul. 11, 2023

(54) CONTROL METHOD FOR ELECTRONIC APPARATUS

(71) Applicant: ASUSTeK COMPUTER INC., Taipei (TW)

(72) Inventor: Chien-Yi Wang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/386,839

(22) Filed: Jul. 28, 2021

(65) Prior Publication Data
US 2022/0043520 A1   Feb. 10, 2022

(30) Foreign Application Priority Data
Aug. 5, 2020   (TW) .................................. 109126596

(51) Int. Cl.
| | | |
|---|---|---|
| G06F 3/023 | (2006.01) | |
| G06F 3/0487 | (2013.01) | |
| G06F 3/04847 | (2022.01) | |

(52) U.S. Cl.
CPC .......... *G06F 3/0238* (2013.01); *G06F 3/0487* (2013.01); *G06F 3/04847* (2013.01)

(58) Field of Classification Search
CPC ... G06F 3/0238; G06F 3/04847; G06F 3/0487
See application file for complete search history.

(56) References Cited

U.S. PATENT DOCUMENTS

| | | | | |
|---|---|---|---|---|
| 5,877,746 A | * | 3/1999 | Parks ................. | H04N 1/00416 715/835 |
| 7,308,654 B2 | * | 12/2007 | Ageta .................. | G06F 1/1616 715/779 |
| 8,065,452 B1 | * | 11/2011 | Lo ......................... | G06F 3/0231 710/73 |
| 8,937,620 B1 | * | 1/2015 | Teller .................. | G11B 27/031 345/473 |

(Continued)

FOREIGN PATENT DOCUMENTS

| | | | | |
|---|---|---|---|---|
| CN | 105808049 A | * | 7/2016 | ........... G06F 3/0481 |
| CN | 107544683 A | | 1/2018 | |
| CN | 105808049 B | | 3/2019 | |

OTHER PUBLICATIONS

Windows 7 Keyboard Settings, YouTube, https://www.youtube.com/watch?v=L35bCJrGeeE, Steve Welch, Oct. 17, 2015 uploaded, Video 0:00-4:45.

*Primary Examiner* — Carolyn R Edwards
(74) *Attorney, Agent, or Firm* — McClure, Qualey & Rodack, LLP

(57) ABSTRACT

A control method is provided, which is applied to an electronic apparatus including an input device. The control method includes the following steps: detecting whether a setup program exists or not, wherein the setup program includes a plurality of adjusting information; detecting whether the setup program is executed or not, when the setup program exists; receiving a selecting instruction, when the setup program is executed; generating a control signal (Continued)

according to the selecting instruction and the adjusting information; receiving an input signal generated by the input device; and delaying and processing the input signal according to the control signal.

8 Claims, 2 Drawing Sheets

(56) References Cited

U.S. PATENT DOCUMENTS

| | | | |
|---|---|---|---|
| 2002/0018080 A1* | 2/2002 | Ageta | G06F 1/1616 |
| | | | 715/810 |
| 2003/0160769 A1* | 8/2003 | Numano | G06F 3/03547 |
| | | | 345/173 |
| 2007/0046627 A1* | 3/2007 | Soh | G06F 21/83 |
| | | | 345/156 |
| 2015/0062046 A1* | 3/2015 | Cho | G06F 3/04842 |
| | | | 345/173 |
| 2016/0259433 A1* | 9/2016 | Stephenson | G06F 3/03543 |
| 2017/0017376 A1* | 1/2017 | Han | G06F 9/454 |
| 2020/0110470 A1* | 4/2020 | Meyers | G06F 3/044 |
| 2020/0286603 A1* | 9/2020 | Ajilore | G16H 20/70 |

* cited by examiner

CONTROL METHOD FOR ELECTRONIC APPARATUS

CROSS-REFERENCE TO RELATED APPLICATION

This application claims the priority benefit of Taiwan applications serial No. 109126596, filed on Aug. 5, 2020. The entirety of the above-mentioned patent application is hereby incorporated by reference herein and made a part of specification.

BACKGROUND OF THE INVENTION

Field of the Invention

The invention relates to a control method for electronic apparatus.

Description of the Related Art

An input device is one of the necessary tools when using an electronic apparatus. The electronic apparatus relies on the input device to input various commands. For example, the input device is a keyboard, controlled by pressing the keys to send signals. Different keyboards have different performances in trigger sensitivity, and each user also has different operation habits. When the user uses an unfamiliar keyboard, the keyboard may not perform well.

BRIEF SUMMARY OF THE INVENTION

A control method is provided, which is applied to an electronic apparatus including an input device. The control method includes the following steps: detecting whether a setup program exists or not, wherein the setup program includes a plurality of adjusting information; detecting whether the setup program is executed or not, when the setup program exists; receiving a selecting instruction when the setup program is executed; generating a control signal according to the selecting instruction and the adjusting information; receiving an input signal generated by the input device; and delaying and processing the input signal according to the control signal.

DETAILED DESCRIPTION OF THE EMBODIMENTS

Figure 1:
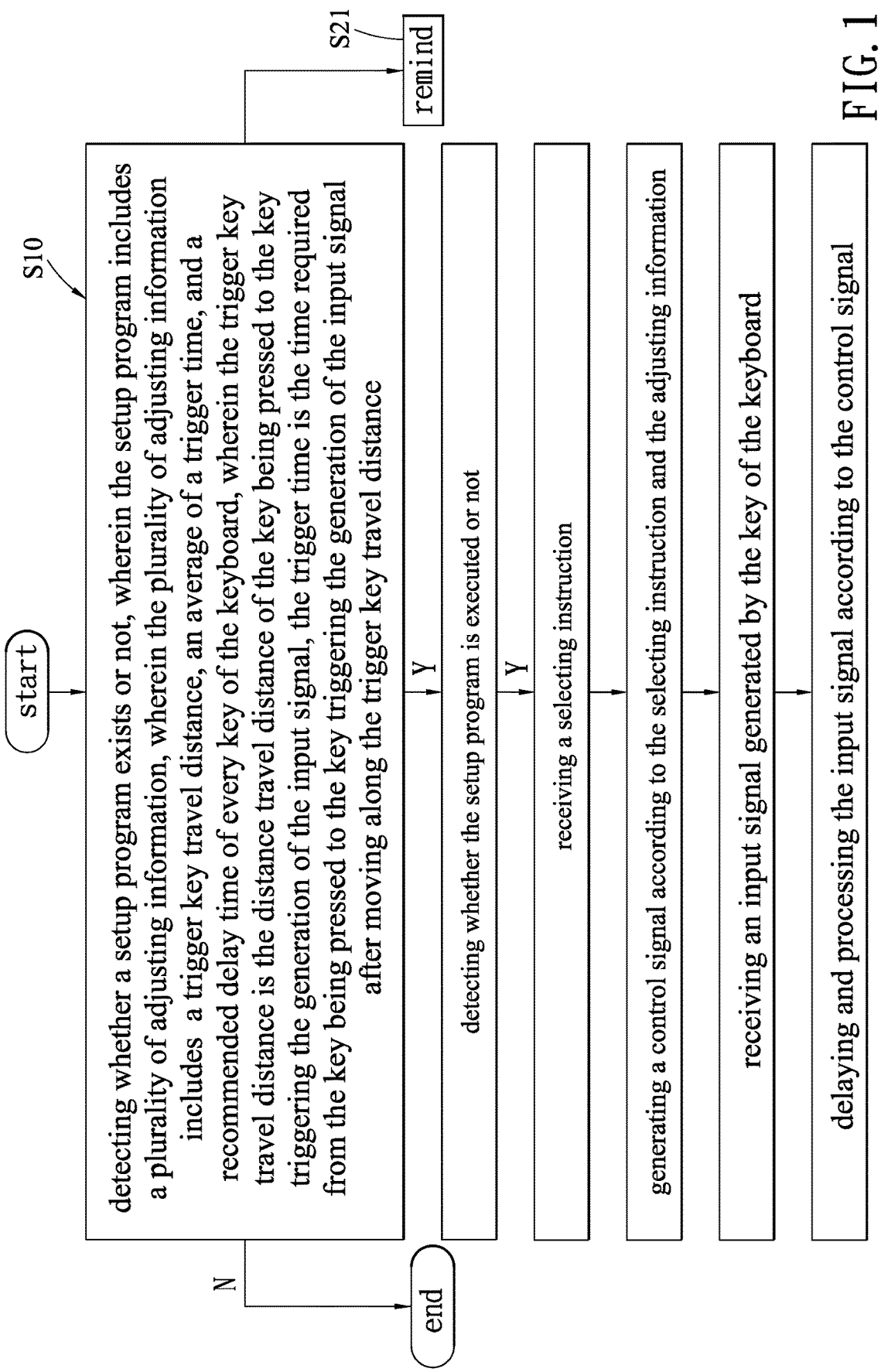
FIG. 1 is a schematic flow diagram of a control method in an embodiment.

Please refer to FIG. 1. FIG. 1 is a schematic flow diagram of a control method in an embodiment. The control method is applied to an electronic apparatus with an input device.

Referring to FIG. 1, the control method includes the following steps: detecting whether a setup program exists or not (step S10), and the setup program includes a plurality of adjusting information. When the setup program exists, detecting whether the setup program is executed or not (step S20). When the setup program is executed, receiving a selecting instruction (step S30). Generating a control signal according to the selecting instruction and the adjusting information (step S40). Receiving the input signal generated by the input device (step S50). Delaying and processing the input signal according to the control signal (step S60).

In one embodiment, the electronic apparatus is equipped with the input device. The electronic apparatus is a notebook computer, a desktop computer, a tablet computer, or an industrial computer, which is not limited herein.

In one embodiment, the input device generates the input signal by pressing a button. In this embodiment, the input device is a keyboard. In some embodiments, the input device is, but is not limited to, a membrane keyboard, a mechanical keyboard, a capacitive keyboard, or an optical keyboard.

In one embodiment, the electronic apparatus includes a processor, and the input device is coupled to the processor of the electronic apparatus. When a user inputs information through the input device, the input device generates the input signal, and the processor of the electronic apparatus processes the input signal and performs corresponding actions. Then, when the setup program exists in the electronic apparatus and is executed, it receives the selecting instruction and the input signal, and the processor delays and processes the input signal according to the control signal, and then delays the trigger.

In one embodiment, the electronic apparatus includes a display coupled to the processor. In this embodiment, the setup program provides a user interface for the user to input the selecting instruction.

In one embodiment, the setup program is an application to install or uninstall. Therefore, in the step of detecting whether the setup program exists or not (step S10), when the electronic apparatus is turned on, the electronic apparatus automatically detects the presence or absence of the setup program, or the detection is manually triggered by the user.

In one embodiment, when detecting that the existence of the setup program exists, automatically detecting whether the setup program is executed or not (step S20); when it is detected that the setup program does not exist, displaying a prompt message on the display to remind the user that the setup program does not currently exist and it cannot provide the function of delaying and processing of the input signal of the input device.

In one embodiment, when it is detected that the setup program exists and is executed, the display displays the user interface provided by the setup program.

In one embodiment, when it is detected that the setup program exists but is not executed, repeatedly enters the step of detecting the execution of the setup program (step S20) to continuously detect the execution of the setup program, to receive the selecting instruction immediately when the setup program is executed.

In another embodiment, when it is detected that the setup program system exists but is not executed, enters a prompt step (step S21). The prompt step (step S21) is to display the detection result on the display to remind the user to manually execute the setup program to enter a state to receive the selecting instruction when the user wants to delay and process the input signal of the input device.

In one embodiment, when it is detected that the setup program is executed, the user interface provides different control modes for the user to choose.

In one embodiment, the control mode includes a first menu and a second menu. The first menu has a plurality of preset modes, and a first selecting instruction is generated after selection. The second menu provides selecting control range of the input device (such as controlling all the input devices or a part of the input devices). After selection, a second selecting instruction is generated.

In one embodiment, the first menu includes "yes/no to execute delay control", "system automatic selection", "set up based on delay situation", "custom time (input time)", "custom time (slider bar)" and "select trigger key travel distance" and other control modes for selection.

Figure 2:
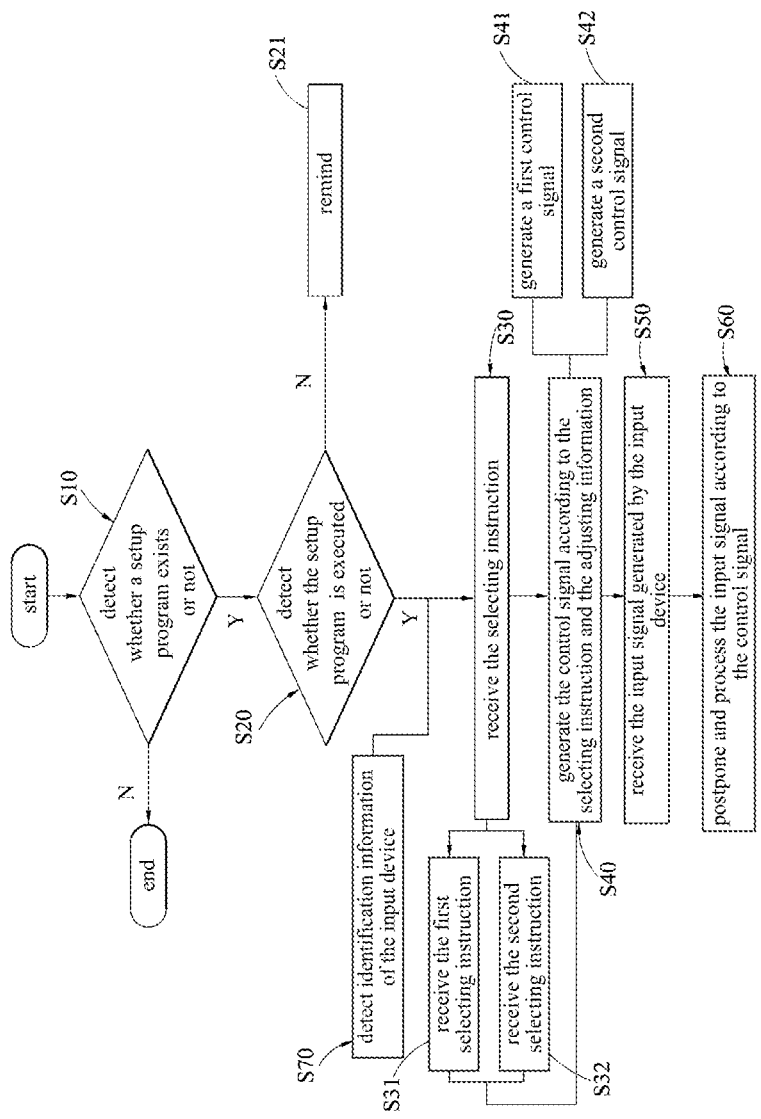
FIG. 2 is a flowchart of a control method in another embodiment.

In one embodiment, when the user selects the control mode from the user interface, the setup program generates the selecting instruction correspondingly, and the processor receives the selecting instruction (step S30 as shown in FIG. 2). In one embodiment, when the user selects the first menu from the user interface, the setup program generates the first selecting instruction correspondingly; when the user selects the second menu from the user interface, the setup program generates the second selecting instruction.

Referring to FIG. 2, after the processor receives the first selecting instruction (step S31) and the second selecting instruction (step S32), steps of generating a first control signal (step S41) and generating a second control signal (step S42) are further included. Here, the processor generates the first control signal according to the first selecting instruction and the adjusting information (step S41), and generates a second control signal according to the second selecting instruction (step S42).

In one embodiment, the adjusting information is part of the setup program. In other words, when the user installs the setup program, the adjusting information is stored in the electronic apparatus. In one embodiment, the adjusting information of the setup program is stored in the storage device of the electronic apparatus, the cloud database, or both at the same time.

In one embodiment, the adjusting information includes the trigger key travel distance, the average trigger time, and the recommended delay time of the input device. In addition, in order to apply to other external input devices, the adjusting information also includes the trigger key travel distance, the average trigger time and the recommended delay time of the input device with various models, specifications, and brands.

In one embodiment, when the user selects "system automatic selection" in the first menu, the setup program generates the first selecting instruction, and the processor receives the first selecting instruction (step S30). In step of generating the control signal according to the selecting instruction and the adjusting information (step S40), the processor directly accesses the suggested delay time in the adjusting information in the storage device according to the first selecting instruction as the first control signal.

Referring to FIG. 1 and FIG. 2, when the first control signal is generated (step S41) in this embodiment, the processor calculates and generates the first control signal based on the adjust information according to the first selecting instruction. Specifically, the processor generates the first control signal though calculating the suggested delay time of different delay situations according to the trigger stroke and total displacement stroke of the input device. Here, the trigger strokes and the total displacement strokes of the keys of different input devices are different. The shortest stroke of the key to complete the trigger is the trigger stroke and the longest stroke of the key continuously in the trigger state is the total displacement stroke.

In the embodiment, the input device has a trigger time corresponding to the trigger stroke and a bottoming time corresponding to the total displacement stroke. A plurality of the suggested delay time with different delay situations are formulated by separating the interval between the trigger time and the bottoming time.

In one embodiment, when the user selects "custom time (input time)" from the first menu, the processor further displays the user defined interface on the user interface. In the embodiment, the user defined interface is a space for filling in a value of the delay trigger time, which is not limited herein. After the user enters a message on the user defined interface of the user interface, the setup program generates the first selecting instruction correspondingly. The user defined interface is a blank for filling in the value of the delay trigger time, which is not limited herein. After the user enters the message on the user defined interface of the user interface, the setup program generates the first selecting instruction correspondingly.

In the step of generating the first control signal (step S41) in the embodiment, the adjusting information further includes upper and lower limits of the suggested delay time of the input device. An upper limit of the suggested delay time is the upper limit value, and a lower limit of the suggested delay time is the lower limit value. The processor extracts the upper limit value and the lower limit value from the adjusting information and displays them on two ends of a slider bar of the user defined interface of the user interface. In this way, the user determines the selected delay trigger time according to the upper limit value, the lower limit value, and a slider.

In one embodiment, the slider bar is long strip shape. When the user changes the slider, based on the upper limit value, the lower limit value and the ratio of the slider to slider bar with the long strip shape, the processor further calculates the delay trigger time corresponding to the slider, and then displays the delay trigger time on the user defined interface for the user to quickly confirm.

Of course, in the embodiment where the user defined interface is a blank for the user to fill in the value of the delay trigger time, the upper limit value and the lower limit value are also displayed at the same time for the user's reference.

In the embodiment where the user input the first selecting instruction through the user defined interface of the user interface, the processor stores the delay trigger time defined by the user and set time information (date/time) in a storage device when the first selecting instruction is generated. In this way, it is convenient to reference when adjusting the delay trigger time next time.

In this embodiment, when the first control signal is generated (step S41), the processor directly extracts the suggested delay time corresponding to a selected trigger key travel distance in the adjusting information as the first control signal according to the first selecting instruction. In this way, when the user is unfamiliar with the trigger key travel distance of the input device, the user changes the trigger time by choosing a familiar trigger key travel distance. Moreover, the trigger time is set to be the same indifferent input devices, so as to meet the needs of the user.

In an embodiment in which the user selects to delay the trigger of the input device through the trigger key travel distance, the user interface displays a blank for the user to enter a number to set the trigger key travel distance. In this embodiment, the processor performs calculations based on user input information and the adjusting information. When the adjusting information does not include the trigger key travel distance set by the user, the processor calculates the suggested delay time proportionally based on the existing data in the adjusting information. In this embodiment, the processor simultaneously extracts the maximum value of the trigger key travel distance and the minimum value of the trigger key travel distance from the adjusting information and displays them on the user interface for reference.

Then, in the step of receiving the input signal generated by the input device (step S50), the processor of the electronic apparatus receives the input signal generated by the input device. Here, the input signal is generated by pressing a key of the input device to complete the trigger. Specifically, the key of the input device includes the trigger key travel distance, and the trigger key travel distance is the distance travel distance of the key being pressed to the key triggering the generation of the input signal. The trigger time is the time required from the key being pressed to the key triggering the generation of the input signal after moving along the trigger key travel distance.

It can be seen that the trigger time of the input device is related to the configuration of the input device. In addition, due to the different configuration of the input devices, input devices also has different operating pressure data. For example, the pressure to move the key is called an initial pressure; the pressure to move the key and complete the trigger is called a trigger pressure. The different properties of the initial pressure or the trigger pressure of the key of the input device also affect the trigger time for the user to use the input device. Of course, the operating force of the user is also related to the trigger time of the input device.

In the step of delaying and processing the input signal according to the control signal (step S60), the processor delays the processing of the input signal according to the control signal to generate the effect of delaying the trigger of the input signal.

In one embodiment, the control method is also applied to an external input device. Referring to FIG. 2, before receiving the selecting instruction (step S30), it further includes detecting identification information of the input device (step S70). Here, the input device has the identification information. After detecting that the setup program is executed, the processor detects the identification information of the input device. In this way, in the step of generating the first control signal (step S41), the processor generates the first control signal according to the selection signal, the identification information, and the adjusting information.

In one embodiment, when the processor receives the first selecting instruction of "system automatic selection" and the first control signal is generated (step S41), the processor determines the suggested delay time according to the first selecting instruction and the identification information of the input device as the first control signal. Here, the identification information of the input device is a model number, a specification, a brand or a combination thereof.

In one embodiment, the electronic apparatus further includes a communication device. The communication device is coupled to the processor. In this embodiment, the adjusting information of the setup program is stored in a cloud database, and the communication device of the electronic apparatus is coupled to the cloud database to retrieve the adjusting information of the cloud database.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A control method, applied to a keyboard having multiple keys, and the control method comprising:
   detecting whether a setup program exists or not, wherein the setup program includes a plurality of adjusting information, wherein the plurality of adjusting information includes a trigger key travel distance, an average of a trigger time, and a recommended delay time of every key of the keyboard, wherein the trigger key travel distance is the distance travel distance of the key being pressed to the key triggering the generation of the input signal, the trigger time is the time required from the key being pressed to the key triggering the generation of the input signal after moving along the trigger key travel distance;
   detecting whether the setup program is executed or not when the setup program exists;
   receiving a selecting instruction when the setup program is executed;
   generating a control signal according to the selecting instruction and the adjusting information;
   receiving an input signal generated by the key of the keyboard; and
   delaying and processing the input signal according to the control signal.

2. The control method according to claim 1, wherein the input device has identification information, the control method further includes detecting the identification information of the input device, and the control signal is generated according to the selecting instruction, the adjusting information and the identification information.

3. The control method according to claim 1, wherein receiving the selecting instruction includes receiving a first selecting instruction and receiving a second selecting instruction, and the control signal is generated according to the first selecting instruction, the second selecting instruction, and the adjusting information.

4. The control method according to claim 1, wherein the selecting instruction is generated from a user defined interface.

5. The control method according to claim 4, wherein the user defined interface is a blank for filling in values.

6. The control method according to claim 4, wherein the user defined interface is a slider bar for changing a slider in different positions.

7. The control method according to claim 5, wherein the control signal includes an upper limit value and a lower limit value, and the control method also includes displaying the upper limit value and the lower limit value in the user defined interface.

8. The control method according to claim 7, wherein the upper limit value and the lower limit value are displayed on both ends of the slider bar.

* * * * *